United States Patent [19]

Bomgardner

[11] Patent Number: 4,566,701
[45] Date of Patent: Jan. 28, 1986

[54] CUSHIONING UNIT SHAFT SEAL

[75] Inventor: Charles T. Bomgardner, Burleson, Tex.

[73] Assignee: Halliburton Company, Duncan, Okla.

[21] Appl. No.: 533,844

[22] Filed: Sep. 19, 1983

[51] Int. Cl.⁴ .............................................. F16J 15/32
[52] U.S. Cl. ....................................... 277/58; 277/152
[58] Field of Search ................ 277/58, DIG. 6, 214, 277/215, 152, 153, 229, 230

[56] References Cited

U.S. PATENT DOCUMENTS

| | | | |
|---|---|---|---|
| 2,944,639 | 7/1960 | Blake | 188/97 |
| 2,944,681 | 7/1960 | Blake | 213/43 |
| 3,013,830 | 12/1961 | Milligan | 277/230 |
| 3,047,162 | 7/1962 | Blake | 213/8 |
| 3,152,699 | 10/1964 | Vickerman | 213/8 |
| 3,207,324 | 9/1965 | Blake | 213/8 |
| 3,233,747 | 2/1966 | Abbott et al. | 213/7 |
| 3,301,410 | 1/1967 | Seay | 213/43 |
| 3,346,265 | 10/1967 | Rhoads et al. | 277/58 |
| 3,451,561 | 6/1969 | Stephenson | 213/8 |
| 3,463,328 | 8/1969 | Blake | 213/43 |
| 3,495,719 | 2/1970 | Peppers | 213/43 |
| 3,568,855 | 3/1971 | Seay et al. | 213/8 |
| 3,589,527 | 6/1971 | Seay et al. | 213/8 |
| 3,589,528 | 6/1971 | Stephenson | 213/43 |
| 3,598,249 | 8/1971 | Vickerman | 213/8 |
| 3,604,568 | 9/1971 | Dobkins | 213/43 |
| 3,647,088 | 3/1972 | Seay et al. | 213/8 |
| 3,752,329 | 8/1973 | Seay et al. | 213/8 |
| 3,791,534 | 2/1974 | Stephenson | 213/43 |
| 3,854,596 | 12/1974 | Stephenson et al. | 213/8 |
| 4,476,772 | 10/1984 | Gorman et al. | 277/58 |

Primary Examiner—Robert I. Smith
Attorney, Agent, or Firm—James R. Duzan; Thomas R. Weaver

[57] ABSTRACT

Improved piston shaft seals for end-of-car hydraulic cushioning devices. Comprising an improved combination of annular oil scraper seals, and improved annular reinforced oil scraper seal, for use in an end-of-car hydraulic cushioning device.

6 Claims, 10 Drawing Figures

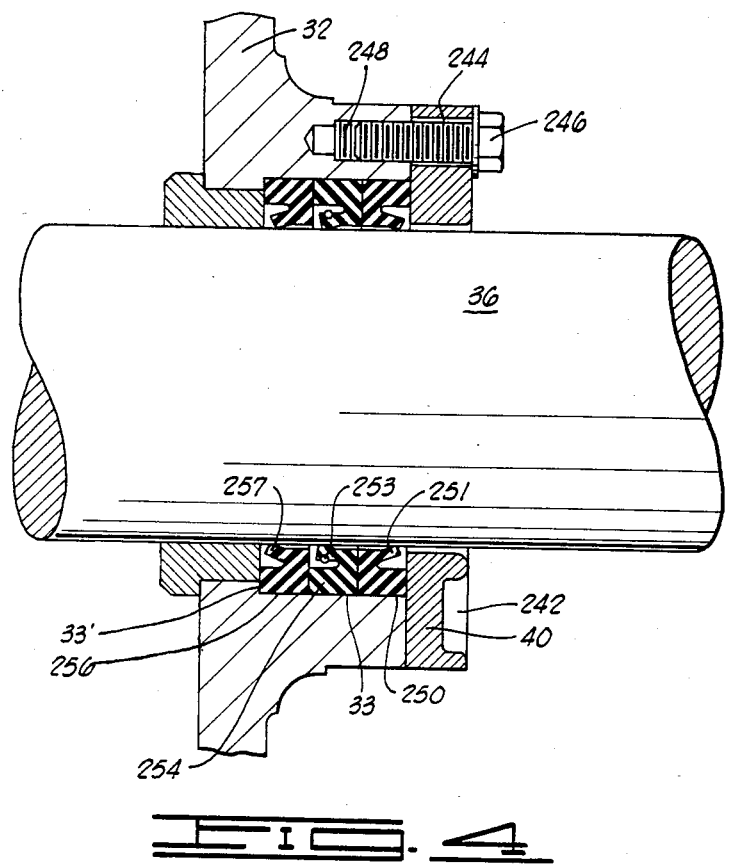
FIG. 4
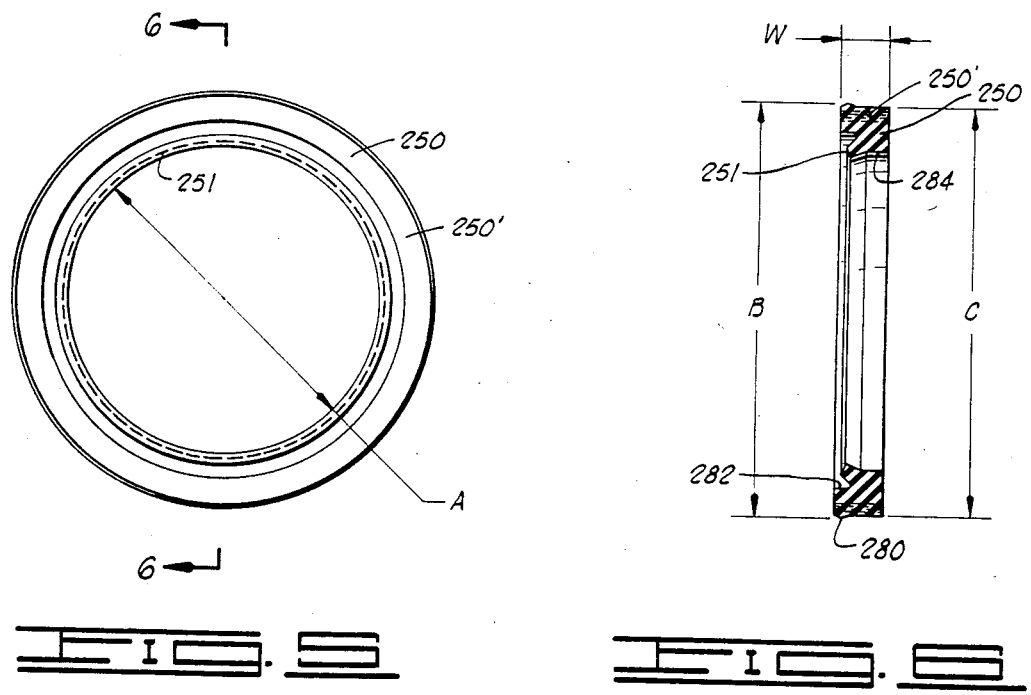
FIG. 5
FIG. 6

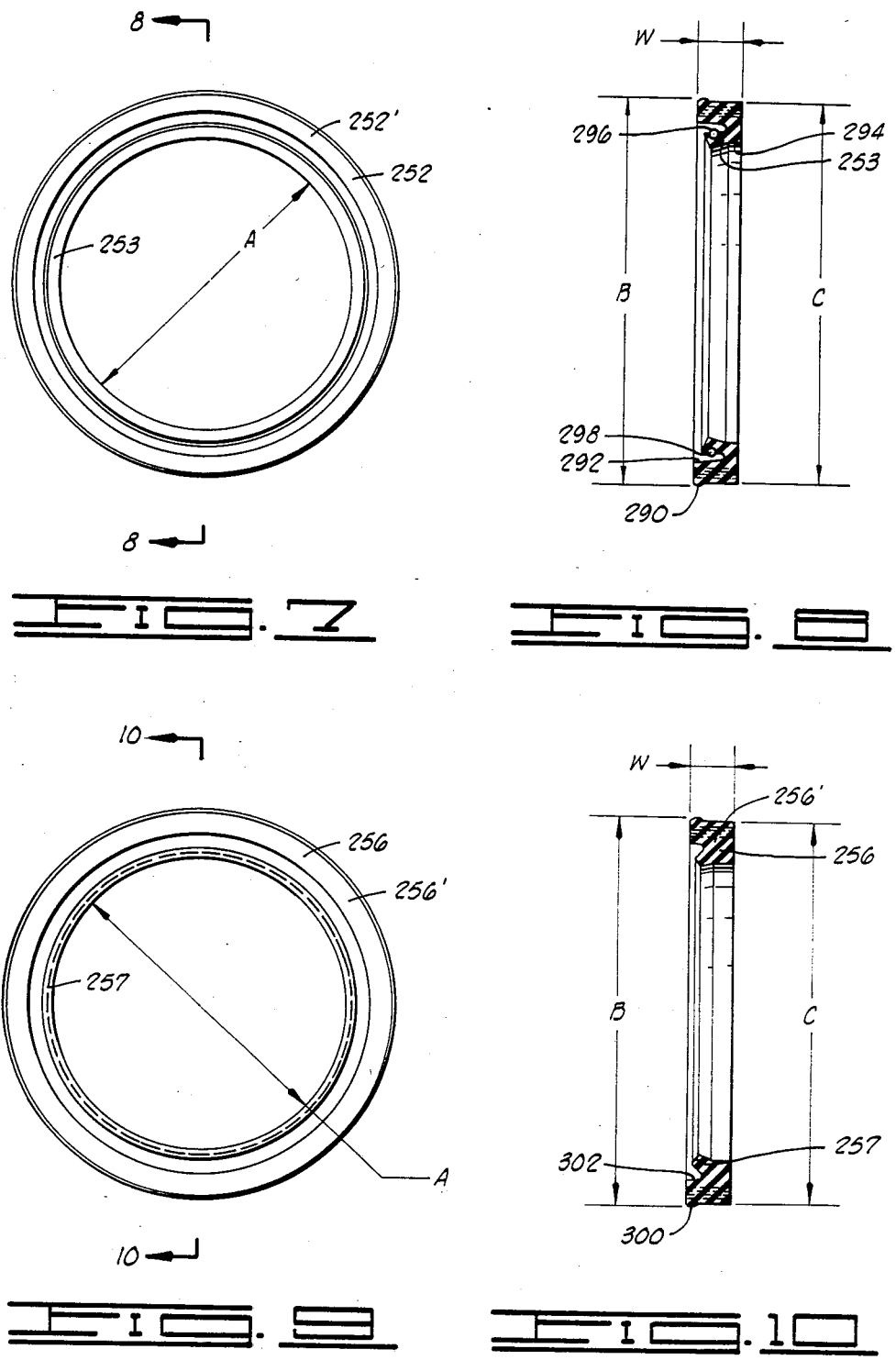

4,566,701

CUSHIONING UNIT SHAFT SEAL

BACKGROUND OF THE INVENTION

This invention relates to improved piston shaft seals for end-of-car hydraulic cushioning devices.

End-of-car hydraulic cushioning devices which are used to control forces transmitted to a railcar during high velocity impacts are well known in the prior art. Typical examples of such prior art cushioning devices and their components are illustrated in U.S. Pat. Nos. 2,944,639; 2,944,681; 3,047,162; 3,152,699; 3,207,324; 3,233,747; 3,301,410; 3,451,561; 3,463,328; 3,495,719; 3,568,855; 3,589,527; 3,589,528; 3,598,249; 3,604,568; 3,647,088; 3,752,329; 3,791,534; and 3,854,596.

With the continued improvements in prior end-of-car cushioning devices, particularly in the piston shaft and piston shaft seal assembly area, it has become desirable to improve the piston shaft seals of the cushioning devices to help eliminate oil leakage from the unit during a wide range of environmental operating conditions.

STATEMENT OF THE INVENTION

The present invention is directed to improved piston shaft seals for end-of-car hydraulic cushioning devices. The present invention comprises an improved combination of improved annular oil scraper seals and an improved annular reinforced oil scraper seal, for use in an end-of-car hydraulic cushioning device.

BRIEF DESCRIPTION OF THE DRAWINGS

The advantages of the foregoing invention can be better understood when taken in conjunction with the following specification and drawings wherein:

FIG. 4 is an enlarged cross-sectional view of the present invention of improved piston shaft seals.

FIG. 5 is a front view of the first improved piston shaft seal of the present invention.

FIG. 6 is a cross-sectional view along line 6—6 of FIG. 5 of the present invention.

FIG. 7 is a front view of the second improved piston shaft seal of the present invention.

FIG. 8 is a cross-sectional view along line 8—8 of FIG. 7 of the present invention.

FIG. 9 is a front view of the third improved piston shaft seal of the present invention.

FIG. 10 is a cross-sectional view along line 10—10 of FIG. 9 of the present invention.

DETAILED DESCRIPTION OF THE INVENTION

Figures 1, 2, 3:
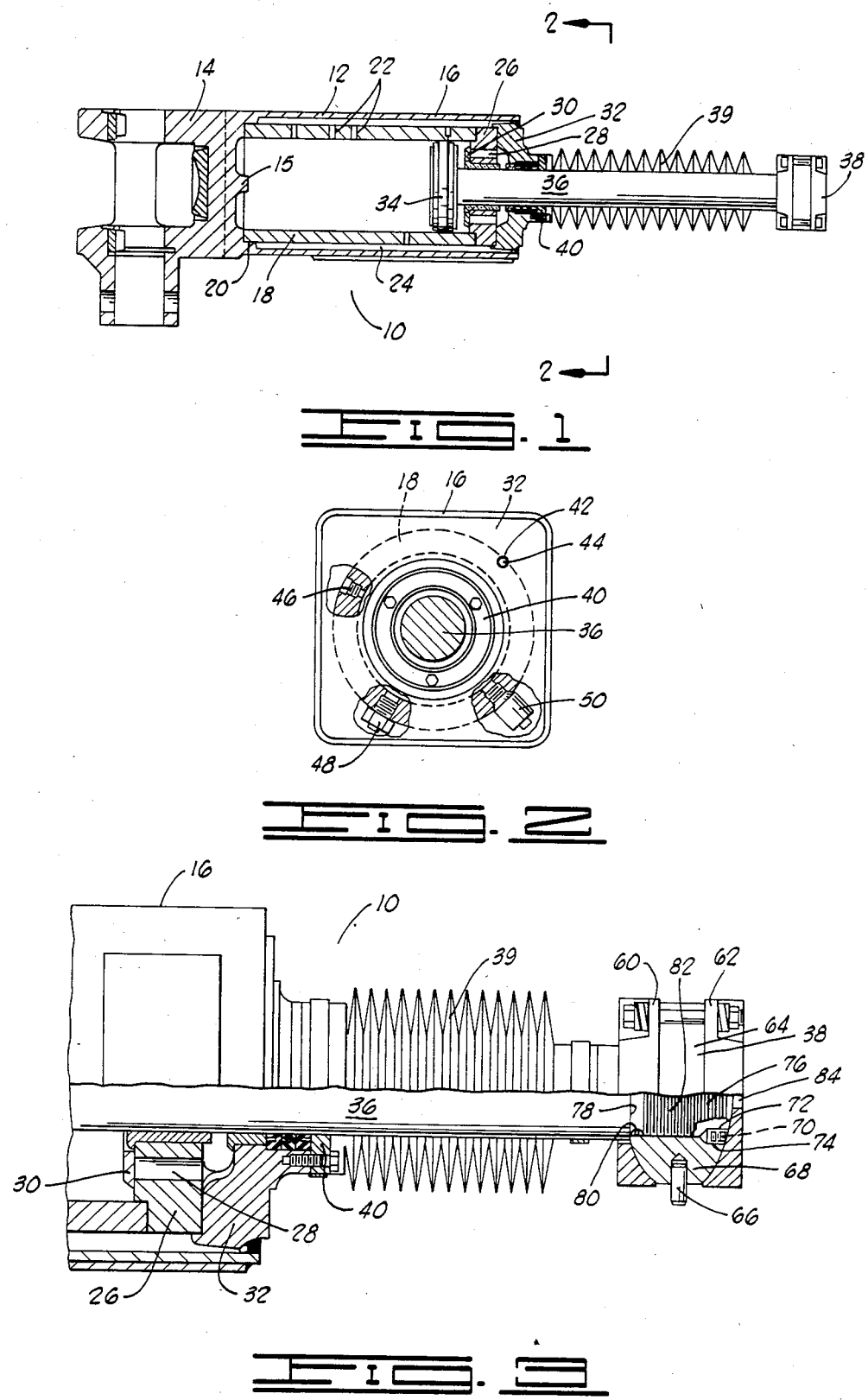
FIG. 1 is a partial cross-sectional view of a typical end-of-car hydraulic cushioning unit utilizing the present invention therein.
FIG. 2 is a view along line 2—2 of FIG. 1 containing partial cut-away portions to illustrate valving not shown in FIG. 1.
FIG. 3 is an enlarged partial cross-sectional view of a portion of the cushioning unit of FIG. 1.

Referring to FIG. 1, an end-of-car hydraulic cushioning unit 10 is shown which utilizes the present invention thereon.

The end-of-car hydraulic cushioning unit 10 comprises a housing 12 which includes a coupler portion 14 and tubing portion 16, a cylinder 18 having one end thereof retained within diameter 20 of coupler portion 14 of housing 12 and having a plurality of metering orifices 22 therein for metering the flow of hydraulic fluid from the high pressure interior of the cylinder 18 to the lower pressure annular area 24 formed between the cylinder 18 and tubing portion 16 of the housing 12, cylinder head plate 26 secured to the other end of cylinder 18 having a plurality of apertures 28 therein and spring biased valve means 30 controlling the flow of fluid from the exterior of the cylinder 18 to the interior thereof during buff stroke portions of the cushioning unit cycle, housing end plate 32 secured to one end of the tube portion 16 of the housing 12, piston 34 slidably received within the cylinder 18, piston shaft 36 having one end thereof secured to piston 34, the remaining portion extending through housing end plate 32, and a diameter of substantially 3.375 inches piston shaft end arrangement 38 secured to the other end of the piston shaft 36 and piston shaft seal configuration 40 slidably, sealingly, receiving piston shaft 36 therethrough and secured to the exterior of the housing end plate 32 to retain the seal configuration thereon.

A bellows 39 is secured to the exterior of the housing end plate 32 and the piston shaft 36 to help prevent abrasive material from adhering to the piston shaft 36.

Referring to FIG. 2, the end-of-car hydraulic cushioning unit 10 is shown when viewed along line 2—2 of FIG. 1 with portions of the housing end plate 32 cut away to expose the various valve members in the cylinder 18 to help control the flow of fluid into and therefrom. As shown, the housing end plate 32 includes hydraulic fluid filler hole 42 having filler plug 44 secured therein for filling the unit 10 with hydraulic fluid. As further shown in FIG. 2, the cylinder 18 further includes secured thereto buff and draft pressure relief valves 46, buff end check valve 48 and buff end run-in valves 50 to control the flow of hydraulic oil to and from the cylinder 18 during the buff and draft strokes of the cushioning unit 10.

The buff and draft pressure relief valves 46 are normally closed valves located in each end of the cylinder 18. The valves 46 are designed to open under a predetermined pressure within the cylinder to retain the hydraulic stroke of the piston 34 in the extreme ends of the cylinder 18 of the unit 10 for extended periods of time.

The buff end check valve 48 is a normally closed valve located in the buff end of the cylinder 18; i.e., the end of the cylinder 18 connected to coupler portion 14 of housing 12. The buff end check valve opens during any extension of the cushioning unit 10 to allow hydraulic oil to flow to the low pressure side of the piston.

The buff end run-in valves 50 are normally open valves located on the buff end of the cylinder 18. However, during impact, the buff end run-in valves 50 are locked in the open position while during train runin, the valves 50 close and restrict hydraulic fluid flow from the cylinder 18.

Referring to FIG. 3, a portion of the end-of-car hydraulic cushioning unit 10 is shown in partial cross-section. As shown, the piston shaft end arrangement 38 comprises front radius plate 60, rear radius plate 62, piston shaft ball 64 threadedly secured to one end of the piston shaft 36, antirotation pin 66, received in aperture 68 and retained therein and interiorly threaded locking pin 70 retained by means of a friction fit and rear radius plate 62 within a bore 72 formed by a portion of the end of the piston shaft 36 and a portion of the piston shaft ball 64.

The end 76 of the piston shaft 36 is formed having an annular shoulder 78, under cut radius portion 80, threaded portion 82 and spherical end surface 84.

Referring to FIG. 4, the improved piston shaft seal assembly 40 and improved seal arrangement therein of the present invention is shown.

The improved piston shaft seal assembly 40 comprises annular seal retainer 242 having a plurality of apertures 244 therethrough having, in turn, a plurality of threaded fasteners 246 extending therethrough engaging threaded apertures 248 in housing endplate 32, first annular oil scraper seal 250, to exclude contaminants, retained within annular recess 33 in housing endplate 32 having a portion retained abutting seal retainer 242, reinforced annular oil scraper seal 252 retained within annular recess 33 of housing endplate 32 abutting first annular oil scraper seal 250, and second annular Oil scraper seal 256 retained within annular recess 33 in housing endplate 32 abutting reinforced annular oil scraper seal 252 and shoulder 33' of recess 33 in housing endplate 32.

Referring to FIG. 5, the first improved annular piston shaft oil scraper seal 250 of the present invention is shown. The annular piston shaft oil scraper seal 250 comprises an annular resilient member having an inner most lip diameter A having a dimension of substantially 3.305 inches. The lip 251 of the seal 250 is formed of resilient synthetic rubber having a hardness of substantially ninety (90) durometer, ± five (5) durometer. The outer rim portion 250' is formed of resilient synthetic rubber containing fibrous reinforcing material therein.

Referring to FIG. 6, the annular piston shaft oil scraper seal 250 is formed having an annular shoulder or rib 280 on the exterior of outer rim portion 250' to energize the seal 250 during use when installed in recess 33 of housing endplate 32. The diameter B of the shoulder or rib 280 is substantially 4.475 inches while the outer diameter C of the outer rim portion 250' is substantially 4.401 inches. The width W of the seal 250 is substantially 0.520 inches. The cylindrical portion 282 of the outer rim portion 250' and the cylindrical portion 284 of the lip 251 may be of any convenient dimension which will facilitate manufacture of the seal 250.

Referring to FIG. 7, the second improved annular piston shaft oil scraper seal 252 of the present invention is shown. The annular piston shaft seal 252 comprises an annular resilient member having an inner most lip diameter A having a dimension substantially of 3.305 inches. The lip 253 of the seal 252 is formed resilient synthetic rubber having a hardness of substantially seventy (70) durometer, ± five (5) durometer. The outer rim portion 252' is formed of resilient synthetic rubber containing fiberous reinforcing material therein.

Referring to FIG. 8, the annular piston shaft seal 252 is formed having an annular shoulder or rib 290 on the exterior of outer rim portion 252' to energize the seal 252 during use when installed in recess 33 of housing endplate 32. The diameter B of the shoulder or rib 290 is substantially 4.475 inches while the outer diameter C of the outer rim portion 252' is substantially 4.401 inches. The width W of the seal 252 is substantially 0.520 inches. The cylindrical portion 292 of the outer rim portion 252' and the cylindrical portion 294 of the lip 253 may be of any convenient dimension which will facilitate manufacture of the seal 252.

To energize the lip 253 of the seal 252 an annular wound spring 296 is retained within annular recess 298 of the lip 253. The annular wound spring 296 biases the lip 252 into engagement with piston shaft 36 to help ensure that the lip 253 of seal 252 engages the piston shaft 36 (not shown) of the cushioning unit 10 to remove or scrape oil therefrom to help prevent oil loss from the unit.

Referring to FIG. 9, the third improved annular piston shaft oil scraper seal 256 of the present invention is shown. The annular piston shaft seal 256 comprises an annular resilient member having an inner most lip diameter A having a dimension of substantially 3.305 inches. The lip 257 of the seal 256 is formed of resilient synthetic rubber having a hardness of substantially seventy (70) durometer, ± five (5) durometer. The outer rim portion 256' is formed of resilient synthetic rubber containing fiberous reinforcing material therein.

Referring to FIG. 10, the annular piston shaft seal 256 is formed having an annular shoulder or rib 300 on the exterior of the outer rim 256'. The diameter B of the shoulder or rib 300 is substantially 4.475 inches while the outer diameter C of the outer rim portion 256' is substantially 4.401 inches. The width W of the seal 256 is substantially in the range of 0.520 inches. The cylindrical portion 302 of the outer rim portion 256' and the cylindrical portion 304 of the lip 257 may be of any convenient dimension which will facilitate manufacture of the seal 256.

Referring again to FIG. 4, the improved annular piston shaft seals 250, 252 and 256 provide an improved, effective sealing arrangement for the piston shaft 36.

It should be understood that while it is possible to provide a very effective scraper type annular piston shaft seal 250 which will remove the oil film from the piston shaft 36 during operation of the cushioning unit 10, it is generally not desirable to do so since the oil removed from the piston shaft 36 will collect in the bellows 39 (not shown, see FIG. 1 or 2) of the cushioning unit 10 and finally drop onto the railcar. Since oil dripping onto the railcar is cause for removing a cushioning unit from service, although the cushioning unit may still have satisfactory levels of performance, it is desirable to seal the piston shaft 36 with seals which maintain a film of oil on shaft 36.

In contrast to the prior art piston shaft seals, the improved piston shaft seals 250, 252 and 256 of the present invention allow the efficient substantially leak-free sealing of the piston shaft 36 and, also, maintain the film of oil on the piston shaft 36 over a wide range of environmental operating conditions.

Having thus described my invention, I claim:

1. An improved combination of piston shaft oil seals for sealing a piston shaft of an end-of-car hydraulic cushioning unit to allow the efficient substantially leak-free sealing of said piston shaft while maintaining a film of oil on said piston shaft over a wide range of environmental operating conditions, the combination comprising:

a first annular piston shaft oil scraper seal of resilient materials, the seal having an inner most lip which sealingly engages said piston shaft having, in turn, a hardness of substantially ninety durometer;

a second annular piston shaft oil scraper seal of resilient material, the seal having an inner most lip which sealingly engages said piston shaft to remove or scrape oil therefrom to help prevent oil loss from said end-of-car hydraulic cushioning unit; and a third annular piston shaft oil scraper seal of resilient material, the seal having an inner most lip having, in turn, a harness of substantially seventy durometer, the third annular piston shaft oil scraper seal sealingly engaging said piston shaft to allow the efficient substantially leak-free sealing of said piston shaft when sealingly engaging said piston shaft in conjunction with the first annular piston shaft oil scraper seal and the second annular piston shaft oil scraper seal while maintaining a film of oil on said piston shaft over a wide range of environmental operating conditions.

2. The improved combination of piston shaft oil seals of claim 1 wherein:
   the first annular piston shaft oil scraper seal further having an outer rim portion of resilient material having, in turn, fiberous reinforcing material therein;
   the second annular piston shaft oil scraper seal further having an outer rim portion of resilient material having, in turn, fiberous reinforcing material therein; and
   the third annular piston shaft oil scraper seal further having an outer rim portion of resilient material having, in turn, fiberous reinforcing material therein.

3. The improved combination of piston shaft oil seals of claim 2 wherein:
   the first annular piston shaft oil scraper seal further having an annular rib on the exterior of the outer rim portion thereof;
   the second annular piston shaft oil scraper seal further having an annular rib on the exterior of the outer rim portion thereof; and
   the third annular piston shaft oil scraper seal further having an annular rib on the exterior of the outer rim portion thereof.

4. The improved combination of oil shaft seals of claim 3 wherein:
   the first annular piston shaft oil scraper seal further having the diameter of the lip substantially 3.305 inches, the diameter of the annular rib on the exterior of the outer rim portion being substantially 4.475 inches, the outer diameter of the outer rim portion substantially 4.401 inches, and a width substantially of 0.520 inches;
   the second annular piston shaft oil scraper seal having the diameter of the lip being substantially 3.305 inches, the diameter of the annular rib on the exterior of the outer rim portion being substantially 4.475 inches, the outer diameter of the outer rim portion substantially 4.401 inches, and a width substantially 0.520 inches; and
   the third annular piston shaft oil scraper seal having the diameter of the lip substantially 3.305 inches, the diameter of the annular rib on the interior of the outer rim portion being substantially 4.475 inches, the outer diameter of the outer rim portion substantially 4.401 inches, and a width substantially 0.502 inches.

5. An improved combination of piston shaft oil seals for sealing a piston shaft of an end-of-car hydraulic cushioning unit installed in a railcar and having a bellows covering a portion of said piston shaft to allow the efficient substantially leak-free sealing of said piston shaft while maintaining a film of oil on said piston shaft over a wide range of environmetal operating conditions, the combination comprising:
   a first annular piston shaft oil scraper seal of resilient material having a width thereof substantially 0.520 inches, the seal having an inner most lip which sealingly engages said piston shaft having, in turn, a hardness of substantially ninety durometer and a diameter substantially 3.305 inches and having an outer rim portion of resilient material having, in turn, fiberous reinforcing material therein, the diameter thereof substantially 4.401 inches and an annular rib on the exterior thereof having, in turn, the diameter thereof substantially 4.475 inches;
   a second annular piston shaft oil scraper seal of resilient material having a width thereof substantially 0.520 inches, the seal having an inner most lip which sealingly engages said piston shaft having, in turn, a hardness of substantially seventy durometer, an annular spring means associated therewith to help ensure the lip of the second annular seal sealingly engages said piston shaft to remove or scrape oil therefrom to help prevent oil loss from said end-of-car hydraulic cushioning unit, and a diameter of substantially 3.305 inches and having an outer rim portion of resilient material having, in turn, fiberous reinforcing material therein, the diameter thereof substantially being 4.401 inches and an annular rib on the exterior thereof, having, in turn, the diameter thereof substantially 4.475 inches; and
   a third annular piston shaft oil scraper seal of resilient material having a width thereof substantially 0.520 inches, the seal having an inner most lip having, in turn, a hardness of substantially seventy durometer and a diameter substantially 3.305 inches, having an outer rim portion of resilient material having, in turn, fiberous reinforcing material therein, the diameter thereof substantially being 4.401 inches, and an annular rib on the exterior thereof having, in turn, the diameter thereof substantially 4.475 inches, the third annular piston shaft oil scraper seal sealingly engaging said piston shaft to allow the efficient substantially leak-free sealing of said piston shaft when sealingly engaging said piston shaft in conjunction with the first annular piston shaft oil scraper seal and the second annular piston shaft oil scraper seal while maintaining a film of oil on said piston shaft over a wide range of environmental operating conditions to help prevent oil from being removed from said piston shaft and collecting in said bellows and falling onto a portion of said railcar.

6. A combination of piston shaft oil seals for sealing a piston shaft of an end-of-car hydraulic cushioning unit, wherein the improvement in the combination of piston shaft oil seals comprises:
   a first annular piston shaft oil scraper seal of resilient material having a width thereof substantially 0.520 inches, the seal having an inner most lip which sealingly engages said piston shaft having, in turn, a hardness of substantially ninety durometer and a diameter substantially 3.305 inches and having an outer rim portion of resilient material having, in turn, fiberous reinforcing material therein, the diameter thereof substantially 4.401 inches and an annular rib on the exterior thereof having, in turn, the diameter thereof substantially 4.475 inches;
   a second annular piston shaft oil scraper seal of resilient material having a width thereof substantially 0.520 inches, the seal having an inner most lip which sealingly engages said piston shaft having, in turn, a hardness of substantially seventy durometer, an annular spring means associated therewith to help ensure the lip of the second annular seal sealingly engages said piston shaft to remove or scrape oil therefrom to help prevent oil loss from said end-of-car hydraulic cushioning unit, and a diameter of substantially 3.305 inches and having an outer rim portion of resilient material having, in turn, fiberous reinforcing material therein, the diameter thereof substantially being 4.401 inches and an annular rib on the exterior thereof, having, in turn, the diameter thereof substantially 4.475 inches; and a third annular piston shaft oil scraper seal of resilient material having a width thereof substantially 0.520 inches, the seal having an inner most lip having, in turn, a hardness of substantially seventy durometer and a diameter substantially 3.305 inches, having an outer rim portion of resilient material having, in turn, fiberous reinforcing material therein, the diameter thereof substantially being 4.401 inches, and an annular rib on the exterior thereof having, in turn, the diameter thereof substantially 4.475 inches, the third annular piston shaft oil scraper seal sealingly engaging said piston shaft to allow the efficient substantially leak-free sealing of said piston shaft when sealingly engaging said piston shaft in conjunction with the first annular piston shaft oil scraper seal and the second annular piston shaft oil scraper seal while maintaining a film of oil on said piston shaft over a wide range of environmental operating conditions.

* * * * *

UNITED STATES PATENT AND TRADEMARK OFFICE
CERTIFICATE OF CORRECTION

PATENT NO. : 4,566,701

DATED : January 28, 1986

INVENTOR(S) : Charles T. Bomgardner

It is certified that error appears in the above-identified patent and that said Letters Patent is hereby corrected as shown below:

In column 2, line 54, delete the word [runin] and insert therefor --run-in--.

In column 5, line 1, delete the word [harness] and insert therefor --hardness--.

Signed and Sealed this

Eighteenth Day of November, 1986

Attest:

DONALD J. QUIGG

Attesting Officer      Commissioner of Patents and Trademarks